United States Patent [19]

Goldsworthy et al.

[11] 3,989,660
[45] Nov. 2, 1976

[54] POLYMERIZATION OF VINYL HALIDES

[75] Inventors: Peter John Goldsworthy, Barry; Mark John Scudamore, Sigginstone, both of Wales

[73] Assignee: BP Chemicals International Limited, London, England

[22] Filed: Apr. 7, 1975

[21] Appl. No.: 565,749

[30] Foreign Application Priority Data
Apr. 16, 1974 United Kingdom............... 16654/74

[52] U.S. Cl. ............... 260/29.6 MQ; 260/29.6 ME; 260/29.6 R; 526/220; 526/225; 526/911; 526/344
[51] Int. Cl.$^2$......................................... C08L 27/06
[58] Field of Search .......... 260/29.6 MQ, 29.6 ME, 260/29.6 R, 92.8 W; 520/220, 225

[56] References Cited
FOREIGN PATENTS OR APPLICATIONS
1,102,980  2/1968  United Kingdom
  978,875  12/1964  United Kingdom

*Primary Examiner*—M. J. Welsh
*Attorney, Agent, or Firm*—Brooks, Haidt, Haffner & Delahunty

[57] ABSTRACT

Aqueous microsuspension polymerization of vinyl halides in which monomer-soluble surfactant is dissolved in the monomer before it is brought into contact with the aqueous phase.

10 Claims, No Drawings

POLYMERIZATION OF VINYL HALIDES

The present invention relates to a polymerisation process and more particularly to a process for the polymerisation of vinyl halides in aqueous dispersion.

There are three types of aqueous dispersion polymerisation commonly used for vinyl halides. These are often known as suspension, emulsion and microsuspension. Suspension polymerisation uses a monomer-soluble free radical initiator and the dispersion droplet size is large, giving polymer particles of a size greater than about 50 $\mu$m, which can be separated from the dispersion by centrifuging or filtering. The dispersion is stabilised by such substances as cellulose ethers, polyvinyl alcohol, gelatin and finely divided inorganic solids such as hydroxy apatite, which are known as dispersants or suspending agents and are not considered to be true surfactants. Stirring is required during polymerisation in addition to the stabilisers to prevent the dispersion collapsing.

Emulsion polymerisation, on the other hand, uses water-soluble initiators and the polymer is formed as a latex of particles usually of less than 1 $\mu$m diameter which cannot be separated from the aqueous phase by centrifuging or filtering. True surfactants are used to stabilise the dispersions, which are normally stable on standing, although the polymerisation is stirred.

Microsuspension polymerisations, like suspensions, use monomer soluble initiators but the polymer is formed as a latex of particles, usually less than 2 $\mu$m diameter but sometimes up to as much as 20 $\mu$m which cannot be separated from the aqueous phase by centrifuging or filtering. These latices are normally isolated by spray-drying to give polymers which can form pastes when mixed with plasticisers. True surfactants are used as stabilisers and often a system containing more than one surfactant or surfactants and surfactant modifiers are used. These dispersions unlike suspensions or emulsions cannot simply be produced by stirring the monomer and water in the presence of the surfactant using the normal degree of agitation required during polymerisation.

To produce a microsuspension the monomer, stabiliser and water must be homogenised before the polymerisation by the application of a strong shear force, (the process being known generically as homogenisation for the purpose of this invention) to produce a dispersion of the required droplet size. A large number of forms of apparatus may be used for homogenisation for example a high pressure nozzle, a colloid mill, ultrasonic agitation or a high speed stirrer. A high pressure nozzle is preferred. Mild agitation is used during polymerisation, comparable to or milder than that used in suspension or emulsion polymerisation, as if too vigorous agitation is used the dispersion collapses.

The present invention is concerned with microsuspension polymerisation. The surfactant and surfactant modifiers, i.e. surfactant system for such a polymerisation have until now been dissolved or dispersed in the aqueous phase rather than the monomer phase prior to homogenisation. It will be appreciated that vinyl halides are gaseous under the commonly used conditions of temperature and therefore have to be maintained in the liquid phase under pressure.

Accordingly the present invention comprises a process for the polymerisation of a vinyl halide-containing monomeric material under microsuspension conditions stabilised by a surfactant system comprising a monomer-soluble surfactant, wherein the monomer-soluble surfactant is dissolved in the monomeric material before the monomeric material is brought into contact with the aqueous phase.

Any vinyl halide monomer may be used, alone or with a copolymerisable monomer. Preferably the monomer is vinyl chloride alone or with not more than 30% by weight of a copolymerisable monomer such as vinylidene chloride, vinyl acetate, acrylonitrile ethylene, propylene, styrene, acrylic and methacrylic esters, maleates, fumarates and vinyl alkyl ethers.

Any microsuspension process suitable for polymerising vinyl halide monomers can be used. Preferably any water-soluble surfactant is added to the aqueous phase before homogenisation, which preferably takes place in a high pressure nozzle homogeniser. The initiator may be dissolved in the monomer phase or dispersed in the aqueous phase. The polymerisation temperature may be conventional i.e. in the range 30° to 80° C.

Any conventional free radical initiator that is active within this temperature range may be used. Examples of such initiators are acetyl cyclohexyl sulphonyl peroxide, caprylyl peroxide, lauroyl peroxide, benzoyl peroxide, t-butyl peroxy pivalate, azobis-isobutyronitrile, 2,2'-azobis-2,4-dimethyl valeronitrile, and peroxydicarbonates such as dicyclohexyl-peroxydicarbonate.

The surfactant system is the total mixture of surfactants and surfactant modifiers responsible for maintaining the microsuspension. It may consist only of the monomer-soluble emulsifier.

The monomer-soluble emulsifier has sufficient solubility in the monomer that an effective amount of emulsifier dissolves. Thus it is preferred that the solubility of the emulsifier in the monomer under the conditions used to prepare the solution of the emulsifier and transport it to the polymerisation reaction system is at least 0.5% by weight. Preferred emulsifiers are those which, at the concentration required for the polymerisation, will dissolve completely and easily in the amount of monomer to be used in the polymerisation, but which will not dissolve to any appreciable extent in the amount of water to be used in the polymerisation.

Any monomer-soluble emulsifier can be used. Examples of suitable emulsifiers are the monomer-soluble ammonium and alkali metal salts of esters of sulphosuccinic acid. It is preferred to use sulphosuccinates of formula

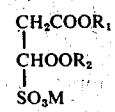

wherein $R_1$ is an alkali metal, ammonium or an alkyl group, $R_2$ is an alkyl group and M is an alkali metal or ammonium and where $R_1$ and $R_2$ are both alkyl they are alkyl having 8 to 20 carbon atoms in each alkyl group, and where $R_2$ alone is alkyl, it is alkyl having at least 16, e.g. 16 to 25 carbon atoms.

Where both $R_1$ and $R_2$ are both alkyl it is particularly preferred that each contains from 10 to 15 carbon atoms. Where only $R_2$ is alkyl it is preferred that it does not contain more than 20 carbon atoms.

Examples of specific sulphosuccinates which may be used are, sodium octyl sulphosuccinate and sodium bis tridecyl sulphosuccinate.

Other monomer-soluble surfactants may be non-ionic types prepared by ethoxylating long-chain alcohols, carboxylic acids or substituted phenols.

The surfactant system may also comprise other components apart from the monomer-soluble surfactant. These may be added to the water used as the polymerisation medium. These other components may include soluble surfactants, but any surfactant added to the water is preferably a water-soluble surfactant, i.e. is capable of solution in the water employed in the process.

Examples of suitable water-soluble surfactants are alkyl sulphates and sulphonates or alkyl aryl sulphonates, soaps prepared by neutralising long-chain saturated monocarboxylic acids, or water-soluble sulphosuccinate esters of the same general chemical formula given above. (The solubility of the sulphosuccinate esters depends on the length of the alkyl groups).

Surfactant modifiers for the purposes of the present invention are polar hydrocarbons derivatives such as long-chain saturated alcohols or monocarboxylic acids which form complexes at the monomer/water interface with a water-soluble surfactant thus increasing the stabilising power of the latter.

Preferred modifiers are long-chain saturated alcohols or monocarboxylic acids containing from 8 to 24 carbon atoms per molecule.

Preferably the monomer-soluble surfactants and/or surfactant modifiers are placed in a charging bomb in which it is dissolved in vinyl halide monomer at a temperature in the range 5° C to 35° C and under autogenous pressure. The solution is then passed to a mixing vessel containing the aqueous phase from which the mixture is fed through an homogenising device to a conventional polymerisation vessel. Optionally the aqueous phase can be charged to the mixing vessel after the monomer phase. The initiator may be added to either the monomer or aqueous phase.

Using the process of the present invention leads to a consistent low level of reactor fouling compared with charging monomer-soluble surfactants or surfactant modifiers to the aqueous phase. By fouling is meant the polymer which remains adhered to the polymeriser wall or agitator and or that which is present in the final slurry as coagulum.

The invention is illustrated by the following Example and Comparative Test.

EXAMPLE 1

A vinyl chloride polymerisation was carried out in the following manner. All parts are by weight.

A solution of 135g (0.5 parts) of commercially available sodium lauryl sulphate and 33.5kg (125 parts) towns water were charged to a pressure vessel. 27kg (100 parts) vinyl chloride was charged to the pressure vessel via a charging bomb containing the monomer-soluble surfactant viz. 386g (1.43 parts) Aerosol TR70 (a 70% aqueous alcohol solution of sodium bis-tridecyl sulphosuccinate) and the monomer-soluble initiator viz. 81g (0.3 parts) caprylyl peroxide.

The above mixture was then pumped into the polymerisation vessel through an homogenising nozzle at 100 atmospheres pressure so that the mean vinyl chloride droplet diameter was reduced to about 1 μm. The temperature of the agitated suspension was increased to 48° and the polymerisation was allowed to proceed at this temperature until the pressure in the polymerisation vessel had fallen to 60 psig. At this point the vessel and its contents were cooled and the unpolymerised vinyl chloride removed.

The polymerisation time was 11 hours 30 minutes and the total solids content of the latex product was 41.4% with fouling of 2.5% (based on weight of initial monomer).

COMPARATIVE TEST 1

A further polymerisation was carried out according to the procedure outlined in Example 1 except that the monomer-soluble surfactant viz. Aerosol TR70 was charged to the water phase prior to the addition of the vinyl chloride monomer.

The polymerisation time was 12 hours and the total solids content of the latex product of 38.6% with fouling of 14.7% (based on weight of initial monomer).

Comparing this test with Example 1 shows that fouling was considerably reduced by the procedure of the present invention and that reaction time was slightly shorter.

We claim:

1. A process for polymerizing a vinyl halide-containing monomeric material which comprises first dissolving a monomer-soluble surfactant in said monomeric material, then bringing said solution into contact with an aqueous phase, homogenizing said mixture, and polymerizing said monomeric material in the presence of a monomer-soluble initiator.

2. A process according to claim 1 wherein the vinyl halide is vinyl chloride.

3. A process according to claim 2 wherein the vinyl halide-containing monomeric material contains not more than 30% by weight of vinyl halide of a copolymerisable monomer.

4. A process according to claim 3 wherein the vinyl halide-containing monomeric material consists solely of vinyl chloride.

5. A process according to claim 1 wherein the monomer-soluble surfactant used is a salt of a sulphosuccinate ester, an ethoxylated long-chain alcohol, an ethoxylated carboxylic acid, or an ethoxylated substituted phenol surfactant.

6. A process according to claim 5 wherein the salt of the sulphosuccinate ester has the formula

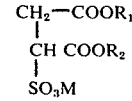

wherein $R_1$ is an alkali metal, an ammonium group or an alkyl group, $R_2$ is an alkyl group, and M is an alkali metal ion or ammonium ion.

7. A process according to claim 6 wherein $R_1$, when it is an alkali metal, is sodium, and M is a sodium ion.

8. A process according to claim 7 wherein the monomer-soluble surfactant is sodium bis tridecyl sulphosuccinate.

9. A process according to claim 1 wherein the surfactant system also comprises a water-soluble surfactant dissolved in the aqueous phase before it is brought into contact with the monomer.

10. A process according to claim 9 wherein the water-soluble surfactant is sodium lauryl sulphate.

* * * * *